United States Patent [19]
Florent

[11] Patent Number: 5,771,308
[45] Date of Patent: Jun. 23, 1998

[54] IMAGE PROCESSING APPARATUS AND METHOD FOR DETERMINING LOCALLY THE CENTER AND SEMI-WIDTH OF OBJECTS CONTRASTED AGAINST A BACKGROUND

[75] Inventor: Raoul Florent, Valenton, France

[73] Assignee: U.S. Philips Corporation, New York, N.Y.

[21] Appl. No.: 388,864

[22] Filed: Feb. 15, 1995

[30] Foreign Application Priority Data

Feb. 16, 1994 [FR] France .................................. 94 01770

[51] Int. Cl.$^6$ .............................. G06K 9/00; G06K 9/46; G06K 9/50
[52] U.S. Cl. ........................... 382/130; 382/201; 382/286
[58] Field of Search .................................. 382/130, 289, 382/201, 286

[56] References Cited

U.S. PATENT DOCUMENTS

| | | | |
|---|---|---|---|
| 5,054,094 | 10/1991 | Barski | 382/201 |
| 5,471,550 | 11/1995 | Kurachi | 382/289 |

OTHER PUBLICATIONS

"Automated Identification of Vessel Contours in Coronary Arteriograms by an Adaptive Tracking algorithm" Ying Sun, IEEE Transactions on Medical Imaging, vol. 8, No. 1, Mar. 1989.

*Primary Examiner*—Andrew W. Johns
*Assistant Examiner*—Monica S. Davis
*Attorney, Agent, or Firm*—Jack D. Slobod

[57] ABSTRACT

A method of processing an image representing an object of substantially uniform intensity contrasted against a background of uniform intensity includes the determination of a trace (Δ) of the image cutting the object in a segment (I) and the scanning of the image by said trace starting from an origin pixel (yl). Firstly, at each current pixel (Pi) with ordinate (yi), a first function [E(a,yi), V(a,yi)] of stored cumulated sums is determined, computed beforehand over intervals of the trace which are delimited by the origin pixel (yl) and by end pixels defined by the abscissa (yi) of the current pixel and by a semi-width parameter (a), and a particular optimal value [E(yi); V(yi)] of the first function of the cumulated sums is estimated within limits (al, am) of the semi-width parameter. Then, over the set of pixels of the trace, a second function of said particular optimal values [E(yi), V(yi)] is constructed, and an optimal value [E(yo), V(yo)] of the second function is estimated. Also, the center (yo), and the semi-width [a(yo)] of the segment (I) are estimated, as, respectively, the abscissa (yo) of the pixel of the trace, and the value [a(yo)] of the semi-width parameter, which correspond to the optimal value [E(yo), V(yo)] of the second function. An arrangement includes storage and computing devices for implementing this method.

2 Claims, 7 Drawing Sheets

IMAGE PROCESSING APPARATUS AND METHOD FOR DETERMINING LOCALLY THE CENTER AND SEMI-WIDTH OF OBJECTS CONTRASTED AGAINST A BACKGROUND

FIELD OF THE INVENTION

The invention relates to a method of processing an image, which includes the representation of at least one object consisting of pixels of substantially uniform intensity contrasted against a background consisting of pixels of substantially uniform intensity.

The invention also relates to an arrangement for implementing this method.

The invention finds its application in the determination of the contours of any object which is represented in an image and which shows a contrast with a substantially uniform background.

The invention finds its application for example in the field of digital image formation systems for assisting the detection of anomalies such as stenoses from angiographs of the human or animal body.

Angiographs are special images for visualizing the blood vessels. Several types of angiographs can be performed such as, coronary angiographs for visualizing the arteries irrigating the heart muscle, or myocardium, these arteries together forming the coronary tree; peripheral angiographs for visualizing the irrigation of the lower and upper limbs; and cerebral angiographs. Interest will be focused below by way of example on coronary angiographs. Stenoses are local narrowings caused by partial or total obstructions which appear on arteries. In the case of the coronary tree, stenoses seriously compromise the irrigation of the myocardium and require to be detected by a physician from angiographs.

The introduction, in latter years, of digital radiography, which combines the use of an X-ray detector yielding a real-time image and the digitizing of the images, has constituted a major advance in the field of image formation, as compared with conventional radiography. In effect, it provides access to the numerous possibilities offered by digital image processing techniques.

Other processes for forming angiographic images are also known, such as the processes using nuclear magnetic resonance.

In all cases, the invention takes no account of the process by which the digital image was obtained, nor of the nature of the objects which it represents, but relates solely to the processing of this digital image to determine the central points and the edge points of the objects represented, provided that these objects constitute sufficiently uniform masses contrasted against a sufficiently uniform background.

BACKGROUND OF THE INVENTION

An automated method of identifying contours of vessels in coronary angiographs is known from the publication entitled "Automated Identification of Vessel Contours in Coronary Arteriograms by an Adaptive Tracking Algorithm", by Ying SUN, in IEEE Transactions on Medical Imaging, Vol. 8, No. 1, March 1989. This document describes an algorithm for "tracking" the central line of the vessels, for identification of the contours of these vessels in digital angiographs. The algorithm essentially comprises three steps which are:

1) Identification of the points situated on the central line of a vessel. Each point of the central line has three attributes: its position, the direction of a vector parallel to the direction of the stretch of vessel to which the point belongs, and the semi-width of the vessel at this point. Once given a start point $P_k$ on the central line from the vessel, the algorithm computes a point $P_{k+d}$ at a given distance d in the direction of the attribute vector from the start point $P_k$. Next, convolutive filtering is performed by means of a rectangular filter with principal orientation perpendicular to the said vector, that is to say parallel to the scan direction at the start point $P_k$.

This filtering allows the identification of a point $P'_{k+d}$, determined by performing the convolution between the actual density profile along the scan line passing through the point $P_{k+d}$, and an ideal density profile of rectangular shape. The result of the convolution delivers a vector whose maximum value is sought, this relating to a pixel which corresponds to the maximum in the intensity profile and allowing the updating of the new point $P'_{k+d}$.

2) Identification of the edges of the vessel: the edges of the vessel corresponding to the new point $P'_{k+d}$ are identified as the position of the points of inflection on a profile of transverse intensity, that is to say perpendicularly to an attribute vector of the point $P'_{k+d}$ resulting from an update. The semi-width of the vessel is then likewise updated, then the new point $P_{k+d}$ of the line with sought-after center is finally identified.

The method is repeated for all the points situated on scan lines perpendicular to the first attribute vector of the start point $P_k$, from k+1 to k+d. This direction vector is kept the same over the whole distance d. The scan direction changes each time the direction vector changes.

In the case of a bifurcation, the method chooses the vessel branch which has the highest intensity, so that the updated intensity profile no longer exhibits a double peak.

3) Spatial averaging: this "tracking" method generates a description of the vessel as N inputs. Each input is characterized by a triplet=position of a point on the center line of the vessel; direction of a vector parallel to the center line in a stretch of length d chosen as a function of the curvature of the vessel; and semi-width of the vessel at this point.

A first technical problem which arises in angiograph image processing is the detection of all pathological situations, and the elimination of false alarms.

Pathological situations, contrary to what is indicated in the cited document, do not merely comprise stenoses which appear in the form of a local narrowing in a vessel, which therefore simply exhibits a local minimum of width. Pathological situations also comprise a so-called "stairshape" type of narrowing which appears on a vessel of a first substantially uniform width, through the abrupt transition to a second width smaller than the first. This kind of "stairshape" may imply that we have here a so-called main vessel, of a first width, which has divided into two vessels, one of which, of the second width, is still visible forward of the main vessel, but the other of which is now completely occluded onwards of its branching with the main vessel and has henceforth disappeared, having become completely invisible on the angiograph.

The only means of detecting this completely occluded and henceforth invisible vessel is to detect the "staircase" narrowing on the main vessel.

The latter pathological situation cannot be recognized by the algorithm described in the cited state of the art; this is because the "tracking" of the vessel is designed to follow the track of the main vessel and eliminate that of the secondary vessels. Thus, the known method is incapable of distinguishing the case in which a "stairshape" appears due to the fact that on branching one of the two secondary vessels has completely disappeared which is a serious pathological case, from the non-pathological case in which the two secondary vessels are still present on branching. Since the characteristic "stair" shape is the only warning enabling the physician to discern the occluded vessels, this type of algorithm does not offer the physician the possibility of detecting these pathological situations which are important both in terms of number and seriousness as regards the condition of the patient.

A second technical problem which arises is the construction of radiology apparatus fitted with means for the totally automatic detection of the pathological situations described above, namely the first situation of local narrowing of vessels, and the second situation of "stairshape" narrowing. Totally automatic detection is understood to mean that the evidencing of pathological situations is to be carried out without the assistance of an operator.

The production of angiographs assumes that a patient, in general awake, will be injected, for example via the femoral artery by means of a catheter, with a contrast agent; next, an operator carries out a series of radiographs of the coronary tree in the form of a video image sequence at a rate of 30 images per second, for example. Such a sequence thus makes it possible to visualize several cardiac cycles. The stenoses or narrowings described above are the principal abnormalities to be detected. However, this detection can be made difficult by virtue of an unfavorable orientation of the vessels, or the passing of a vessel in the background behind a vessel situated in the foreground. It is therefore necessary to exploit various projection angles and also to try to detect the stenoses in all the images of the video sequence for which the concentration of the contrast agent is sufficiently high to ensure adequate visibility of the vessels.

There are therefore quite a number of negatives and the physician establishes his diagnosis by running these images slowly past his eyes. A need is then apparent to evidence in advance and automatically the pathological situations spoken of above. Indeed, the physician tends, psychologically, to have his attention drawn to the most evident pathological situations, and to overlook certain less visible situations which may however be more worrying, or more serious, clinically, for the outlook of the patient. Or else, the physician may overlook certain pathological situations because they appear in just one image, or in a few images of the sequence.

It is therefore important for the physician to be able to employ a system for evidencing pathological situations in such a way as to draw his attention to the locations in the images, or the locations in the single or few images of the sequence which in fact contain the most interesting information, which it is indispensable to examine. His attention may thus be drawn to the locations least likely a priori, but which nevertheless contain pathological situations; and furthermore, his attention may be diverted from focusing on a few obvious stenoses which however lack great importance from the standpoint of medical monitoring.

Such total automation of the detection of pathological situations can only be implemented if there has been previous success in automating the detection of the position of the objects in the digital image, for example by determination of the position of their center points, and if furthermore there has been success, previously, in automating detection of the position of their edges, or of their contours, for example by determination of their semi-width in a given direction, from the corresponding center point.

Such automation of the determination of the center lines and contour lines leads to the subsequent ability to automate the detection of any anomaly pertaining to the dimensions or shape of the objects in the digital image.

Such total automation of the detection of pathological situations cannot be achieved using the known algorithm of the cited document.

This known algorithm of the cited document is not robust enough to allow subsequent total automation of the method for detecting stenoses. The lack of robustness is due to the fact that the algorithm determines the points of the vessel center line through successive approximations starting from a start point, and because it uses noise-affected image density profiles. Errors may thus accumulate, this being a drawback when a high degree of automation is envisaged.

Hence, alternatively this algorithm may lead to the following of paths which are not vessels: it may go astray. Alternatively it leads to the omission of interesting paths. It must then be restored to the path which it is actually desired to follow. As a result, due to this lack of robustness, guidance is needed.

Furthermore, in the case in which a bifurcation appears while tracking a vessel, the known algorithm is designed to follow the branch which exhibits the greatest intensity, thus eliminating the tracking of the secondary vessel, since this known algorithm does not permit the processing of the problem which appears when the intensity profile exhibits a double peak. Examination of the secondary vessels has therefore to be carried out by repositioning the "start point" of the algorithm at the location of the branching, on the secondary vessel abandoned during a first pass, so as now to perform the steps of the algorithm while following this secondary vessel. In order to follow all the vessels of a relevant vital region, the known algorithm therefore, for this additional reason, again needs guidance, and cannot therefore be automated.

It will be noted that, with reference to FIG. 2 of the cited document, an ideal intensity profile, of rectangular shape, is used to carry out a convolution with the intensity profile obtained by transverse scanning of the vessel under study, so as to determine a vector whose maximum value is sought, which relates to the pixel corresponding to the maximum of the measured intensity profile. This pixel is adopted as the updated point of the center line. To perform this operation, the width of the rectangular ideal profile is fixed A PRIORI. The actual width of the vessel cannot be determined during this step of the algorithm.

Determination of the width of the vessels is carried out in a subsequent step, by identifying the edges of the vessel as the points of inflection on either side of the maximum of the measured transverse intensity profile of the vessel. This step gives an update of the local width of the vessel which will be used to determine the width of the rectangular ideal profile used in determining the next center point in a subsequent step.

SUMMARY OF THE INVENTION

The purpose of the present invention is to provide a method for determining, in an image containing the representation of substantially uniform objects contrasted against a substantially uniform background, the central points as well as the local semi-widths of sections of the objects via scan traces with predetermined directions.

The particular purpose of the present invention is to determine in this way the center points and the points of the edges of objects which are not necessarily the branches of blood vessels but which may be any other object of an image meeting the contrast conditions.

The particular purpose of the present invention is to provide such a process which is robust, that is to say for which the determination of a point does not depend on the determination of a preceding point followed by an approximation.

The purpose of the present invention is also to provide such a process which has no need of guidance, that is to say on which there is no need to impose start points, or on which there is no need to impose a particular search zone.

The purpose of the present invention is also to provide a process capable of working at any resolution, and which allows the determination of the width of an object irrespective of the width determined in a previous step.

The purpose of the present invention is again to provide such a process which does not omit objects of overly small or overly large dimensions or objects arranged at very small distances from one another and which is capable of evidencing discontinuities in this structure.

The particular purpose of the present invention is to provide such a process which can be completely automated.

These purposes are achieved by a process such as defined in the preamble, this method comprising:

the determination of at least one image scan trace Δ, formed by a set of adjacent pixels, said trace cutting said object of the image in a segment I;

the computation and storage of the cumulated sums of the intensities and of the intensities squared of the adjacent pixels over all the intervals of the trace which are delimited by an origin pixel yl on one side, and by each of the pixels respectively of the said set of pixels, labeled end pixels, on the other side;

the construction, over said set of pixels of the trace, of a function of said cumulated sums [E(yi), V(yi)], labeled second function, and the estimation of an optimal value [E(yo), V(yo)] of said second constructed function relating to said set of pixels of the trace;

the estimation of the center yo and of the semi-width a(yo) of said segment I determined by said trace Δ cutting said object of the image, as, respectively, the value of the abscissa yo of pixel of said trace, and the value a(yo) of a parameter a labeled semi-width parameter which yield said optimal value [E(yo), V(yo)] of said second constructed function relating to said set of pixels of the trace.

In an implementation, this method is characterized in that for the construction of said second function of the cumulated sums [E(yi), V(yi)] over said set of pixels, it comprises:

the definition of a parameter a labeled semi-width parameter, evaluated as a number of pixels variable between limits (al, am);

the processing of each of the pixels of said set over the line, in a scan direction starting from said origin pixel yl with, for each current pixel Pi, defined by its abscissa yi on the trace:

the determination of a function [E(a,yi), V(a,yi)] of said stored cumulated sums, labeled first function, relating to said intervals on the trace, the end pixels of which have an abscissa yi defined by the abscissa of the current pixel and by the semi-width parameter a, the estimation of the particular optimal value [E(yi); V(yi)] of said first function relating to said current pixel Pi within the limits (al, am) of said semi-width parameter, and in that in the construction of said second function of the cumulated sums [E(yi), V(yi)], this second function consists of a function of said particular optimal values [E(yi), V(yi)].

Thus, the process according to the invention is robust. The points and values which are determined are so in an absolute manner, not through an approximation based on a preceding value or point. This is very different from the known process and constitutes an essential advantage with a view to automating the process.

Furthermore, the process according to the invention needs no guidance, but systematically determines all the edge points of an object once this object is encountered by a scan trace. It can therefore in essence be automated. It omits no object, be it for reasons of shape or for reasons of dimension as did the known process. This is also a major difference and an essential advantage relative to the known process.

Moreover the process according to the invention makes it possible to distinguish the edges of two objects even when very close together, whereas the known process, either merged the objects or omitted one of them. The process according to the invention is therefore very accurate. This is a major difference and another essential advantage of the invention.

In a particular implementation, this image processing method is characterized in that the determination of said function [E(a,yi), V(a,yi)] of the cumulated sums comprises:

the definition of a rectangular intensity model (M(y)) over said scan trace having:

a first central portion (Ma) of semi-width measured in pixels equal to the value of said semi-width parameter (a);

two second outer portions (Mb1, Mb2) symmetrically flanking the first central portion, of width measured in pixels labeled outer width parameter (b), and the estimation, at said current pixel (Pi) of the cumulated sums:

of the intensities of the pixels squared ($S_2^t$) over the total width (Lt=2a+2b+1) of the model, of the intensities of the pixels ($S_1^a$) over the first central portion (Ma) of the model, of the intensities of the pixels ($S_1^b$) over each of the second outer portions (Mb1, Mb2) of the model, said model being centered on the current pixel (Pi) defined by its abscissa (yi) on said trace, for each value of the semi-width parameter (a) varying within its limits (al, am), and these cumulated sums being expressed by differences between said cumulated sums of the simple or squared intensities of the pixels computed over all the intervals of the scan trace which are delimited on one side by said origin pixel (yl) and on the other side by said end pixels consisting of the edge pixels of the first and second portions of the model.

In a preferred implementation, this method is characterized in that the rectangular intensity model over the scan trace is furthermore defined by:

a first constant intensity (Ga) over the extent of the said first central portion, a second constant intensity (Gb), within each of the second outer portions (Mb1, Mb2), the difference of the first and second intensities having the sign of the difference of the intensities between said object and said background of the digital image, and in that the determination of said function [E(a,yi), V(a,yi)] of the cumulated sums comprises the formulation, by means of said stored cumulated sums, of the function of the quadratic error between:

the actual intensity function [g(y)] of the pixels over said set of pixels of the scan trace, and the intensity function [Ga, Gb] of the rectangular model.

Hence, according to the invention, the center points and the semi-widths are determined by the same procedure which includes only the computation of the cumulated sums of pixel intensities or of squared intensities, over a scan trace. These computations are fast and easy to implement. The process according to the invention is therefore here again particularly advantageous.

Each determination of center and of associated semi-width is performed for a given scan trace, independently of any other previous or subsequent determination. Hence, by providing a suitable number of scan traces, robust and accurate determination of the points of the center lines and edges is obtained according to the invention.

The predetermination of the directions of the scan traces depends on nothing other than the desire to correctly cover the image in order to determine a sufficient number of points. These directions can advantageously be the parallel scan directions in rows and columns known to those skilled in the art. However, any other direction of scan is also possible.

The invention further proposes an arrangement for processing an image including the representation of at least one object OBJ consisting of pixels of substantially uniform intensity contrasted against a background consisting of pixels of substantially uniform intensity, this arrangement comprising:

storage means labeled first storage means MEM1 for storing image data of said image and for providing a trace Δ scanning said image, said scan trace being formed by a set of adjacent pixels and cutting said object OBJ of the image in a segment I;

computing means labeled first computing means CMP1 for computing cumulated sums Σ of intensities, and squared intensities of adjacent pixels in all intervals of said scan trace Δ, these intervals being delimited by a first pixel labeled the origin pixel yl on one side, and by respectively each one of the pixels of said set of pixels, labeled end pixels on the other side;

storage means labeled second storage means MEM2 for storing the output data of said first computing means, computing means labeled third computing means CMP3 for constructing, on said set of pixels of the scan trace Δ, a function of said cumulated sums labeled second function [E(yi), V(yi)] and for further estimating an optimal value [E(yo), V(yo)] of said second function constructed relative to said set of pixels of the trace;

storage means labeled fourth storage means MEM4 for storing a value of the abscissa yo of a pixel of the scan trace Δ, and a value a(yo) of a parameter a labeled semi-width parameter, to constitute the abscissa of the center yo, and the semi-width a(yo) of said segment I determined by said trace Δ cutting said object OBJ of the image, as, respectively, the values which yield said optimal value [E(yo), V(yo)] of said second function of the cumulated sums, constructed by said third computing means;

display means for displaying said image, having a two-dimensional matrix of pixels.

In particular the invention proposes an arrangement such as the above further comprising:

storage means labeled third memory means MEM3 for storing a parameter a labeled semi-width parameter, said parameter being evaluated as a number of pixels variable between two limits al, am;

computing means, labeled second computing means CMP2, for processing each pixel, labeled current pixel Pi defined by its abscissa yi on the scan trace Δ, said second computing means 62 including:

means for determining a function [E(a,yi), V(a,yi)] labeled first function of said stored cumulated sums Σ, relative to said intervals on the scan trace Δ, of which the end pixels have an abscissa defined by the abscissa yi of the current pixel and by the semi-width parameter a, means for estimating a particular optimal value [E(yi), V(yi)] of said first function related to said current pixel Pi, in the limits al, am of said semi-width parameter, said second function of the cumulated sums then being constructed by using said particular optimal values [E(yi), V(yi)] issued of said second computing means, and related to all pixels of the set of pixels of the scan trace Δ.

BRIEF DESCRIPTION OF THE DRAWINGS

The invention is described below in detail with reference to the appended diagrammatic figures in which.

DESCRIPTION OF THE PREFERRED EMBODIMENTS

Figure 1A:
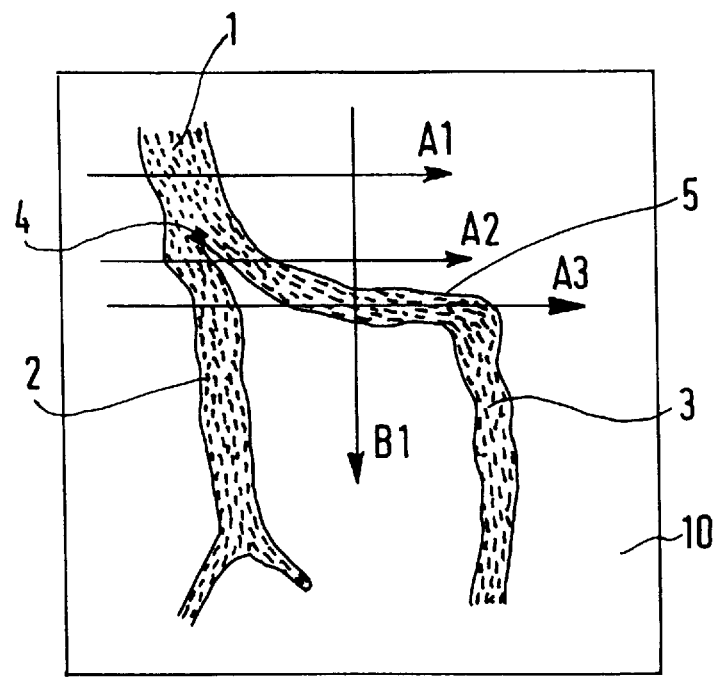
FIG. 1A represents a dark object on a light background in a digital image.

In an example described as a non-limiting instance, the present invention relates to a process for determining, in a digital or non-digital image, such as shown in FIG. 1A representing a tree-like structure, the width of each branch of the structure by determining the points situated at the center of these branches and the points located on the edges of these branches. The present process can be applied without modifying its means to the determination of the position of the center points and points on the edges of any object contrasted against a uniform background in a digital or non-digital image.

In general, the present invention relates to a method of processing an image, which includes the representation of at least one object consisting of pixels of substantially uniform intensity contrasted against a background consisting of pixels of substantially uniform intensity. "Substantially uniform intensity contrasted against" is understood to mean that the variations in intensity over the surface of the object are of an order of magnitude, that is to say around 10 times, or at least 10 times, smaller than the difference between the mean intensity of the pixels of the object and the mean intensity of the pixels of the surrounding background.

One of the particular features of the invention is that it relates to a process, or algorithm, applicable by means of systematic and automatic scanning of the image by traces with predetermined directions. The algorithm is implemented by scanning along this series of traces parallel to a given direction.

Next, optionally, for example in the case of a digital image, the algorithm can be implemented by scanning along a second, or even a third, etc. series of traces parallel to a given second and then third direction respectively, so as better to determine the width of all the branches of the structure or of all the objects possibly having different orientations in the plane of the digital image.

In a simple implementation applied to a digital image, the scan can be performed along the rows and/or columns of pixels of the digital image, but not exclusively. All scan directions are possible; including directions not passing exclusively through pixels.

In the case of a digital image, it should be noted that the scan directions and the number of scan traces in each direction is chosen completely A PRIORI by those skilled in the art, with the sole aim and condition being the sought-after accuracy, that is to say the distance between each scan line which ultimately defines the number of measurements provided by the method.

With reference to FIG. 1A it will be assumed in what follows that the object represented, in this instance, the tree-like structure to be studied, is of substantially uniform intensity, for example black, against a likewise substantially uniform background, for example white.

Nevertheless, this image exhibits several levels of luminance, and as a result the transverse intensity profile of a branch of the structure to be studied, determined during the scan, is not ideally rectangular.

If the background of the image is not sufficiently uniform, those skilled in the art can resort to a preliminary step for extracting the background, such as described by way of non-limiting example in the European Patent Application filed under No. 94202093.4. This is why, in the present description, it is not limiting to speak of uniform background.

With reference to FIG. 1A, a digital image 10 is represented containing as objects: at 1 a first branch of the tree-like structure, for example representing a blood vessel; at 2 and 3 respectively second and third branches arising from the branching 4. The lines, A1, A2, A3 . . . , B1 etc. respectively, represent parallel scan traces in a first direction A and in a second direction B. Each of the scan traces cuts the objects along segments I1, I2 . . . etc. For example, scan trace A1 cuts branch 1 along segment I1; scan trace A2 cuts branches 2 and 5 along segments I2 and I3; scan trace A3 cuts branch 2 along segment I6; scan trace B1 cuts branch 5 along segment I5.

The image 10 is digital, that is to say formed of pixels each endowed with a level of luminance or of intensity. The level of luminance or of intensity can be labeled for example on a scale of luminance levels graduated from 1 to 256. The brightest or light pixels are assigned the largest luminance levels, and the least bright pixels, or dark pixels, are assigned the smallest luminance levels in this scale.

According to the invention, a method is provided for processing the digital image 10, applicable also to a non-digital image, in order to determine the positions of the central points 0 (FIG. 1C) as well as the positions of the extreme points α, β of the segments I1, I2, . . . determined by the cross-section of the objects of the image via traces A1, A2, A3, . . . B1 . . . parallel to the given directions, hereafter termed in general, direction Δ. For this purpose, it is sought to compute the semi-widths of the segments I1, I2 . . . , which will allow determination of the positions α, β, of the extremities of these segments once the positions of the central points of these segments are known on each of the scan traces.

Figure 1B:
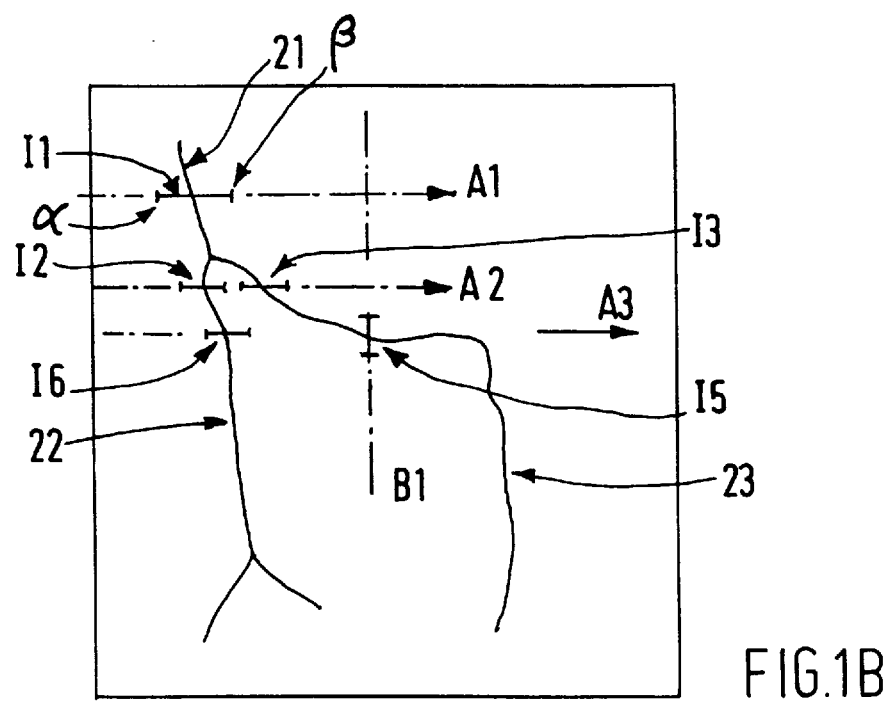
FIG. 1B represents the lines formed by the center points of the object of FIG. 1A.

With reference to FIG. 1B, it is therefore sought to determine, from the structure of FIG. 1A, the center lines such as:

center line 21 of branch 1 of FIG. 1A, center line 22 of branch 2 of FIG. 1A, center line 23 of branch 3 of FIG. 1A.

Figure 1C:
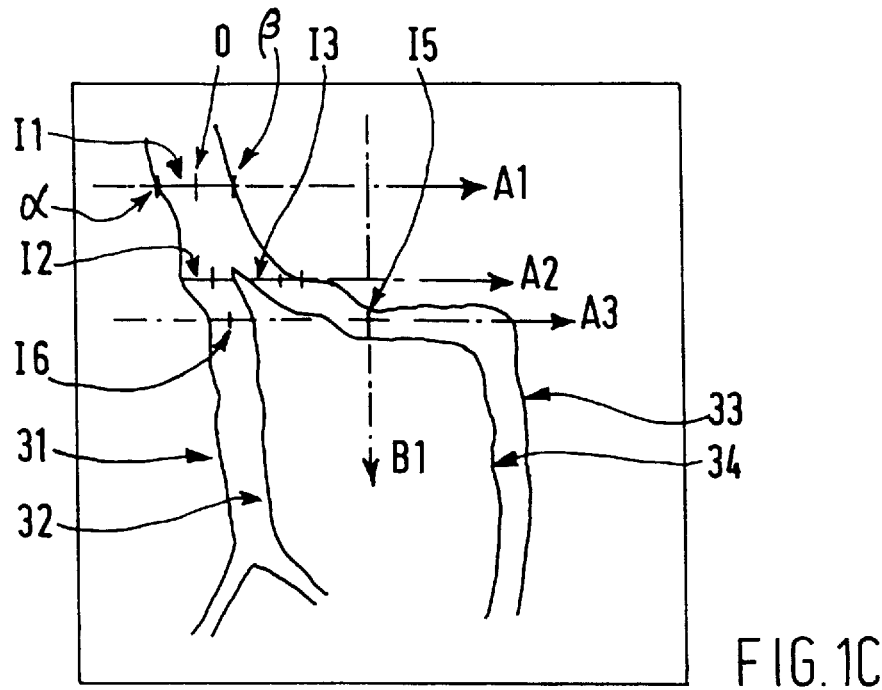
FIG. 1C represents the lines formed by the edge points of the object of FIG. 1A.

With reference to FIG. 1C, it is also sought to determine the edge lines of the branches, such as:

edge line 31 of branch 1 and of branch 2 of FIG. 1A, line 32 along edge of branch 2, line 33 second edge of branch 1 and edge of branch 3, line 34 second edge of branch 3.

When hereafter reference is made to a computed point, instead of a pixel, this implies that with this point is associated a luminance level determined by interpolation as a function of the luminance levels of the pixels chosen in a neighborhood about this point; for example, a neighborhood formed of the 4 pixels closest to this point. It is also possible to compute the luminance of a point, by choosing a neighborhood formed of pixels at various distances from this point. The luminance of each of the pixels of the neighborhood is assigned a weight which decreases the further this pixel is from this point, and the point is assigned a luminance which is obtained by taking into account the weighted luminances of the pixels of the neighborhood.

On a given scan trace Δ will be found either pixels or points, regularly distributed and each endowed with a luminance level. The position of each pixel or point will be referenced on the scan trace Δ by its abscissa "y" measured as number of pixels in the scan direction starting from the origin pixel of the scan trace. A given current point or pixel Pi on the trace Δ will have particular abscissa "yi".

Figure 2A:
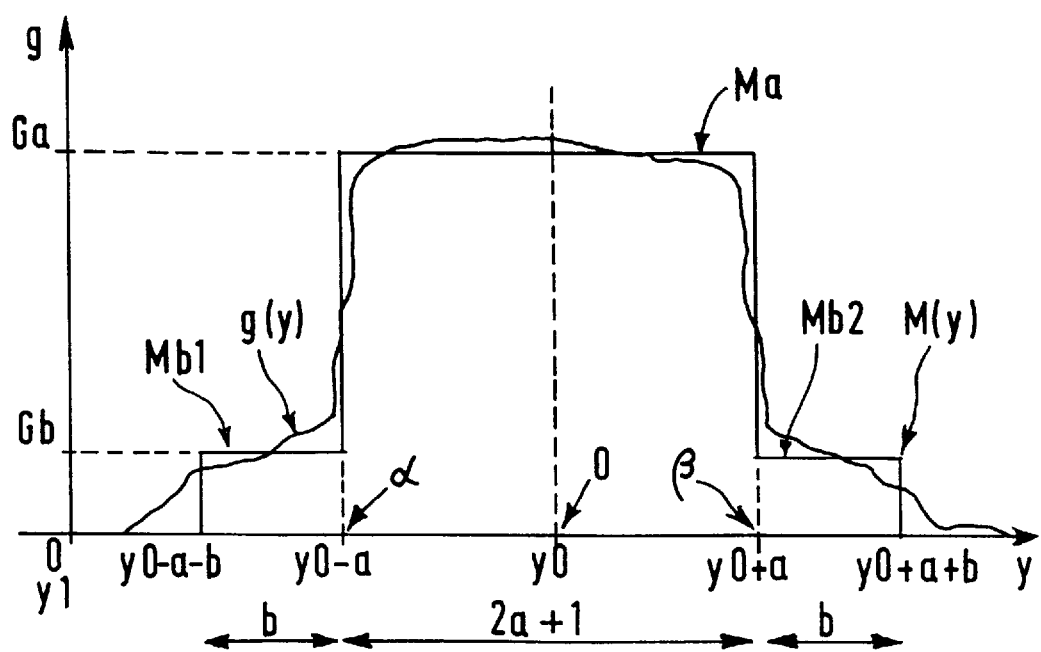
FIG. 2A represents, on the same graph, the actual curve g(y) of intensity of pixels with abscissa y along a direction of scanning of the digital image, and the model M(y) used to determine the center 0 and the edges α, β of the object which provided the actual curve g(y)
Figure 2B:
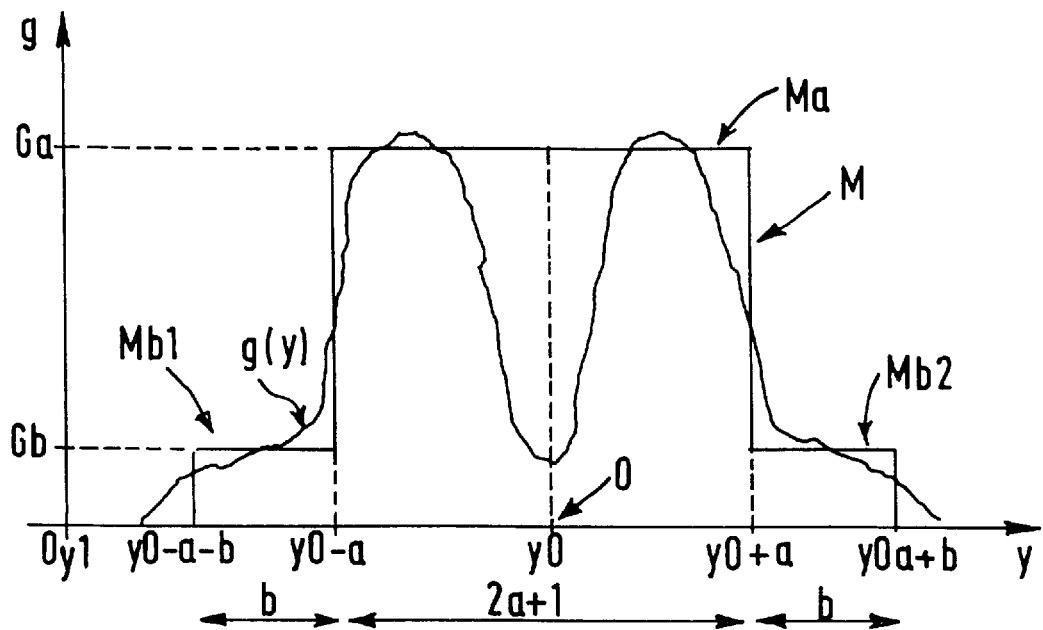
FIG. 2B represents a graph of the same type relating to two close objects of which the image is processed by implementing the first process of the invention.
Figure 2C:
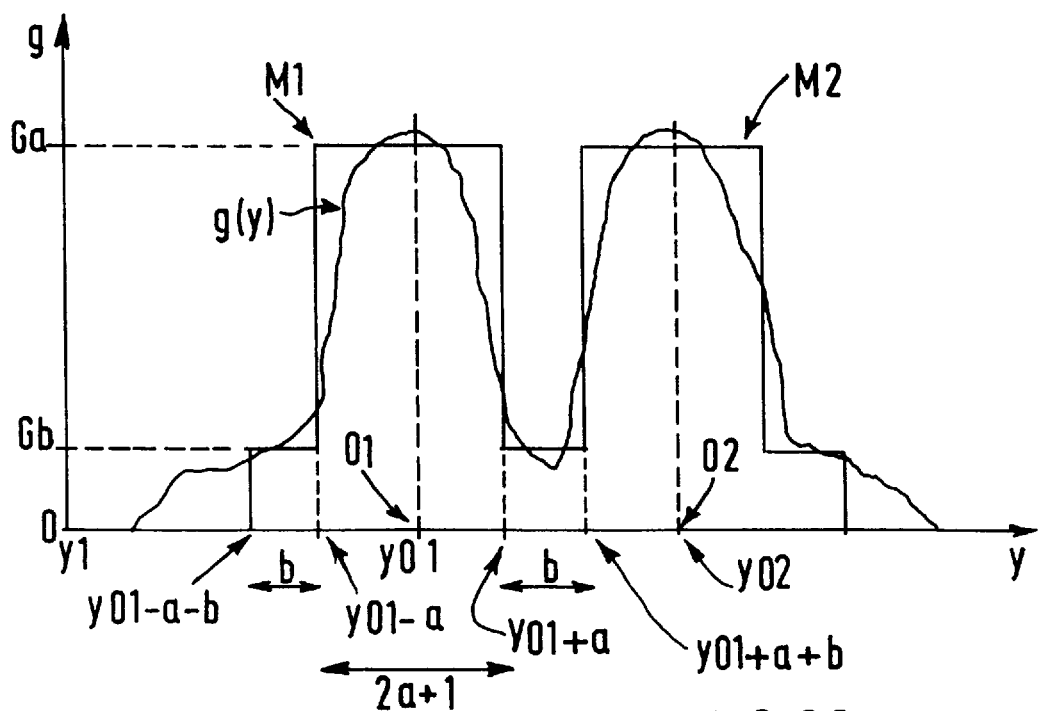
FIG. 2C represents a graph of the same type relating to two close objects of which the image is processed by implementing the second process.

Referring to FIG. 2A, the transverse actual intensity profile g(y) is represented, obtained by scanning the image along the trace A1; with reference to FIG. 2B and 2C, the transverse actual intensity profile g(y) obtained by scanning the image along the trace A2.

On these curves, the value of the intensities is represented inverted, for the convenience of the drawing. That is to say, a black object having therefore a low luminance level is represented by an intensity curve with positive values. Such a representation results from pure convention of no relevance to the method of the invention.

The algorithm or process described below is intended to determine the existence of one or more branches, or objects when scanning with each trace Δ; the local center(s) 0 of the branch(s) on the relevant trace Δ; the local semi-width(s) "a" of the branch(s) on the trace Δ in question; that is to say for example the position "yo" of the center 0 of the segment I1 delimited by the sectioning of branch 1 by the scan trace A1, as well as the semi-width "a" of this segment I1 on this trace A1, leading to the determination of the position of the extremities α and β of this segment I1 on the scan trace A1.

This algorithm is capable of performing this determination regardless of the respective width of these branches or objects, that is to say branches several tens of pixels, or a few pixels only wide; and regardless of the distance which separates the various branches or objects from one another, that is to say a distance of several tens of pixels or of a few pixels only.

According to both processes described below, it is sought firstly to determine a binary model capable of adhering as well as possible to the transverse actual intensity profile g(y) obtained by scanning along a trace Δ chosen from all the possible scan traces Δ of the digital image.

Firstly, a binary function M(y) is sought, forming an ideal model coming as close as possible to the actual profile g(y) as represented in FIGS. 2A, 2B, 2C by way of example. This binary function would therefore be the function representing the ideal transverse intensity profile along the scan trace Δ, of a totally uniform object against a totally uniform background. This model will be termed a "top hat" hereafter. Let M(y) be a top hat chosen to correspond to the profile g(y) of FIG. 2A.

As represented in FIG. 2A, let "yo" be the abscissa of the middle 0 of this top hat M(y) along the trace Δ and Lt its total width. The top hat has a central width La=(2a+1) pixels, and two edges of width Lb1=Lb2=b pixels each. The height of the hat at the center, that is to say the intensity of the pixels in the central portion Ma of the hat, is denoted Ga, and the height of the top hat on either side of the central portion, that is to say the intensity of the pixels in these so-called outer portions Mb1 and Mb2, is denoted Gb.

In the ideal representation of FIG. 2A, the center 0 of the top hat M(y) coincides with that of the section I1, and hence with that of the profile g(y); furthermore, the ends of the central portion of the top hat M(y) coincide with the extremities α, β of this section I1; consequently the semi-width of the object 1, measured by the semi-width of the section I1 on the scan trace A1 of FIG. 1A, is equal to the value of the semi-width of the central portion Ma of the top hat.

Hence, the model, or top hat of FIG. 2A, has been defined by means of 5 parameters: yo, Ga, Gb, a and b.

Above all, a process is sought for determining the center and the semi-width of the branches of the tree-like structure or of other objects of FIG. 1A which can be implemented in real time, that is to say which includes relatively simple and easily implemented computations.

A definition is therefore sought of the model or top hat which uses as restricted a number of parameters as possible.

To determine the parameters "yo" and "a" thus defined earlier, it is sought to minimize the quadratic error between the top hat model M(y) and the actual intensity function g(y) of the pixels along the scan trace Δ.

This quadratic error or error energy is expressed through the formula of the type:

$$E = \Sigma [M(y) - g(y)]^1 \text{a})$$

In this formula, "y" is the abscissa, measured in pixels, of the current pixel P on the scan trace Δ.

If the scan trace Δ does not coincide with a row or a column of pixels of the digital image, it will then be necessary to define, on the scan trace Δ, regularly spaced points whose intensity is determined by interpolation with respect to the intensity of the relevant pixels in a given neighborhood. This process was described above and is already known from the state of the art.

On the trace Δ it may be decided that the current pixel travels along the trace Δ, from the pixel numbered y1, to the pixel numbered yn; for example, it may be decided that the current pixel travels along the whole of the trace Δ from the pixel numbered 1 to the last pixel. In one example, the last pixel may be numbered 500, or 1,000, depending on the extent of the digital image and depending on its definition.

However, whether the trace Δ is gauged in pixels or in points, the serial numbers y1, y2, y3 ... yi ... yn of these pixels or points belong to the set N of positive integers.

Hence, in the formula 1a), the function g(y) is the actual intensity function of the pixels or points on the scan trace Δ, and the function M(y) is the intensity function of the model.

This function relating to the model M(y) can take only 3 values, namely:

M(y)=Ga if "y" belongs to the central portion Ma

M(y)=Gb if "y" belongs to one or other of the outer portions Mb1 or Mb2,

M(y)=0 outside these regions.

In a first analysis of the method, the current pixel Pi is fixed in the position yo, the middle of the hat on the trace Δ, and the quadratic error E is regarded as a minimum when the hat M(y) is ideally centered at the point 0, the middle of the object whose center and edges are sought, hence when all the mid-points are at 0 and have abscissa yo.

The domain covered by the central portion Ma of the hat M(y) is defined by:

$$y \in Ma \text{ when } y \in [yo-a, yo+a]$$

Furthermore, the domain covered by both outer portions of the hat, Mb1 and Mb2, is defined by:

$$y \in (Mb1, Mb2) \text{ when:}$$
$$y \in [yo - (a+b), yo - (a+1)] \cup [yo + a + 1, yo + a + b] \cap N$$

where N is the set of natural integers.

It follows that the quadratic error E is expressed more particularly by:

$$E = \frac{1}{2(a+b)+1} \left\{ \sum_{y \in Mb1, Mb2} [g(y) - Gb]^2 + \sum_{y \in Ma} [g(y) - Ga]^2 \right\} \quad 1b)$$

As a result, this error is a minimum when the first derivatives of the expression E taken versus Gb and versus Ga are zero, which leads to the conditions:

$$\frac{\partial E}{\partial Gb} = 0 \text{ hence } \sum_{g(Mb)} [G(y) - Gb] = 0$$

$$\text{whence: } Gb = \frac{1}{2b} \sum_{y \in Mb} g(y) \quad 2a)$$

$$\frac{\partial E}{\partial Ga} = 0 \text{ hence } \sum_{y \in Ma} [G(y) - Ga] = 0$$

$$\text{whence: } Ga = \frac{1}{2a+1} \sum_{y \in Ma} g(y) \quad 2b)$$

This formulation therefore makes it possible immediately to determine 2 of the 5 parameters invoked earlier: these two parameters are the intensity levels Ga and Gb representing the height of the top hat respectively at the center and either side of the center of the top hat, as a function of the third parameter which is the central width La=(2a+1) of the top hat, and of the fourth parameter which is the width Lb=b of the outer portion of the top hat. It will be recalled that for this first analysis of the method, the fifth parameter yo has been frozen in a particular position.

Turning now to equation 1b), the new expressions 2a) and 2b) having been found for Ga and Gb a new expression for the error E is arrived at:

$$E = \left\{ S_2^t - \left[ \frac{(S_1^b)^2}{2b} + \frac{(S_1^a)^2}{2a+1} \right] \right\} / (2a + 2b + 1) \quad 3)$$

To obtain this expression for the error E, we have, for simplicity, used the notation:

$$S1(yo + a) = \sum_{y=1}^{y=yo+a} g(y) \quad 4a)$$

$$S1(yo - a - 1) = \sum_{y=1}^{y=yo-a-1} g(y) \quad 4b)$$

$$S1(yo + a + b) = \sum_{y=1}^{y=yo+a+b} g(y) \quad 4c)$$

$$S1(yo - a - b - 1) = \sum_{y=1}^{y=yo-a-b-1} g(y) \quad 4d)$$

$$S2(yo + a + b) = \sum_{y=1}^{y=yo+a+b} g^2(y) \quad 4e)$$

$$S2(yo - a - b - 1) = \sum_{y=1}^{y=yo-a-b-1} g^2(y) \quad 4f)$$

It follows, using the simplified notation, that:

$$S_2^t = S_2(yo + a + b) - S_2(yo - a - b - 1) \quad 5a)$$

$$S_1^a = S_1(yo + a) - S_1(yo - a - 1) \quad 5b)$$

$$S_1^b = S_1^{b1} + S_1^{b2} \quad 5c)$$

$$S_1^{b1} = S_1(yo - a - 1) - S_1(yo - a - b - 1) \quad 5d)$$

$$S_1^{b2} = S_1(yo + a + b) - S_1(yo + a) \quad 5e)$$

Figure 3A:
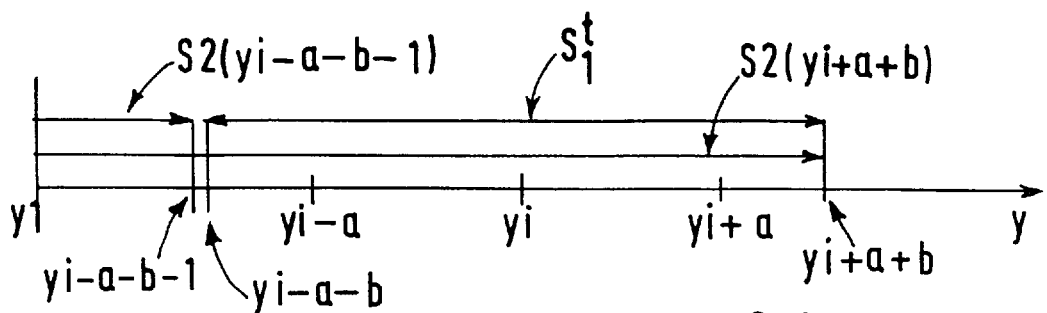
FIGS. 3A, 3B, 3C, 3D illustrate the intervals in pixels, Lt, Ma, Mb2 and Mb1 respectively, over which are computed the cumulated sums $S_1^t$, $S_1^a$, $S_1^{b2}$, $S_1^{b1}$ by taking the difference between the cumulated sums of the simple or squared intensities over the domain extending from pixel 1 of the scan trace to the last pixel of the relevant interval, and the cumulated sums of these intensities over the domain extending from pixel 1 of the scan trace to the pixel before the first pixel of the relevant interval.

With reference to FIG. 3A, $S_2^t$ is regarded as representing the difference between the cumulated sum of the squared intensities within the interval of pixels between the first pixel of $\Delta$ and yo+a+b, and the cumulated sum of the squared intensities within the interval of pixels between the first pixel of $\Delta$ and yo-a-b-1. As a result, this element $S_2^t$ represents the cumulated sum of the intensities of pixels, squared, over the whole length Lt of the hat centered at yo, which is regarded as the position of the current pixel Pi fixed at yo for this step of the computation.

Figure 3B:
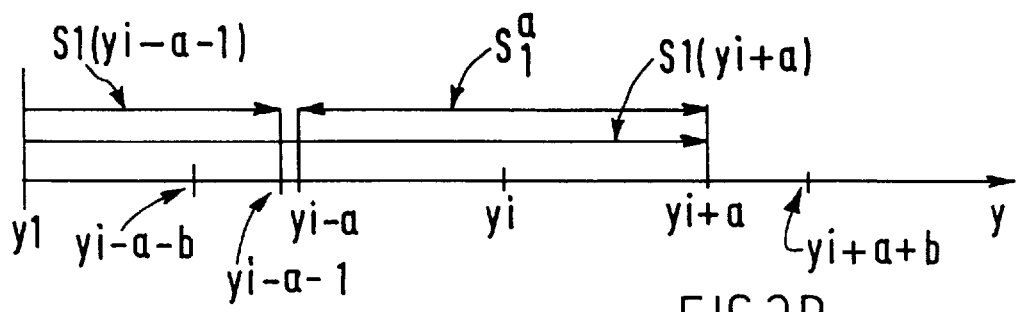

With reference to FIG. 3B, $S_1^a$ is regarded as representing the difference between the cumulated sum of the simple (that is to say not squared) intensities of the pixels situated in the interval between the first pixel of $\Delta$ and yo+a, and the cumulated sum of the simple intensities of the pixels within the interval between the first pixel of $\Delta$ and yo-a-1.

Figure 3C:
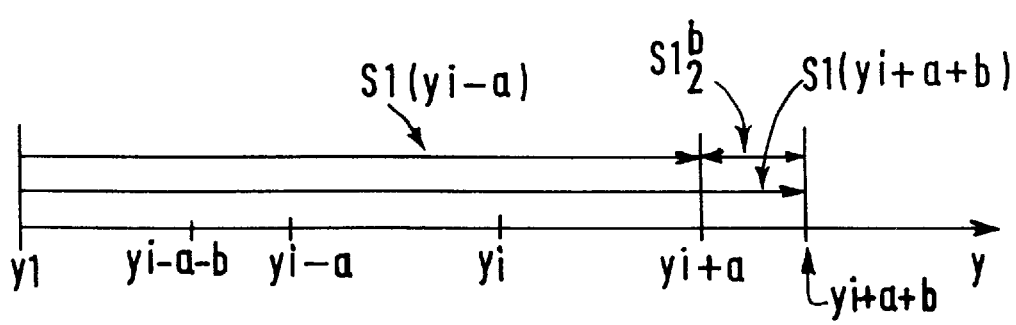

With reference to FIG. 3C, $S_1^{b2}$ is regarded as representing the difference between the cumulated sum of the simple intensities of the pixels situated in the interval between the first pixel of $\Delta$ and yo+a+b, and the cumulated sum of the simple intensities within the interval between the first pixel of $\Delta$ and yo+a.

Figure 3D:
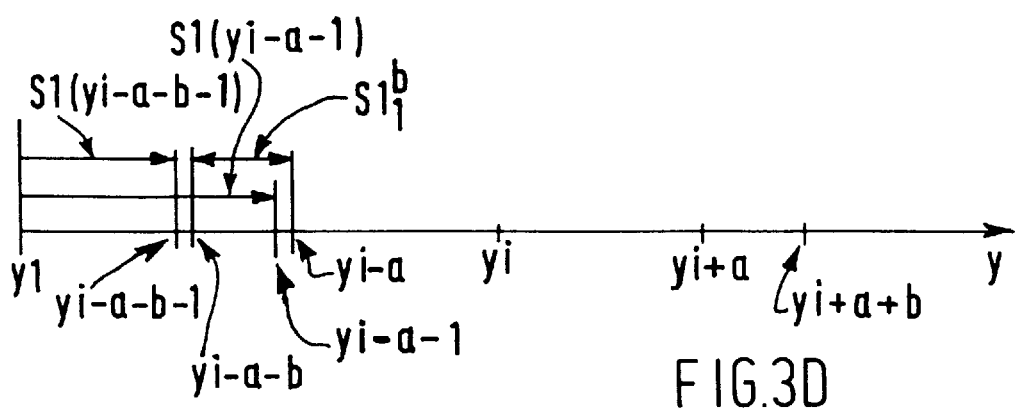

With reference to FIG. 3D, $S_1^{b1}$ is regarded as representing the difference between the cumulated sum of the simple intensities of the pixels situated in the interval between the first pixel of $\Delta$ and yo-a-1, and the cumulated sum of the simple intensities of the pixels situated within the interval between the first pixel of $\Delta$ and yo-a-b-1.

Thus, in order to compute the quadratic error E it suffices in reality to compute once and for all the cumulated sum of the simple intensities or the cumulated sum of the squared intensities for all the pixels of the scan trace $\Delta$ (or all the points having optionally interpolated intensities), and to carry out the subtraction and addition as indicated in relations 5a), 5b), 5c), 5d), 5e) in order to culminate in relation 3) giving the new expression for the quadratic error E.

However, it must be borne in mind that it is sought to carry out the computations in the simplest and fastest possible manner.

It is therefore sought to minimize the number of parameters entering this relation 3) for E.

For this purpose, in a first process, the total width of the top hat Lt is fixed A PRIORI equal to a constant in pixels. Hence $Lt=La+Lb=(2a+1)+2b$ pixels is fixed; the length La of the central portion of the top hat is variable; and the width "b" of the edges of the top hat is altered as a function of the parameter "a" so that the width Lt remains fixed.

Under these conditions, it remains that:

the value of the parameter yo was fixed in the analysis phase of the method so that the center 0 of the top hat M(y) and the current pixel were merged with this center 0 and with the center of the actual intensity profile g(y), the other parameters, 3 in number, a, b, Lt were interdependent.

Since Lt has now been fixed, it merely remains to determine the value of "a" which minimizes the quadratic error expressed by the formula 3).

Since the parameter Lt=2a+2b+1 has been fixed, it follows that, in formula 3), the term $S_2^t$ is a constant. This means that, in order to minimize the error E of formula 3), it suffices to maximize the following function V(a):

$$V(a, yi) = \frac{(S_1^b)^2}{Lt - (2a+1)} + \frac{(S_1^a)^2}{2a+1} \quad 6)$$

For this purpose, the semi-width "a" of the model which maximizes the function V(a) is sought.

This value makes it possible then to compute:

$$Gb = \frac{S_1^b}{Lt - (2a+1)} \text{ and} \qquad 7a)$$

$$Ga = \frac{S_1^a}{2a+1} \qquad 7b)$$

However, those skilled in the art may decide that the variations applied to the value "a" may have limits. It is possible, for example, to elect not to seek to detect the branches or objects whose width is greater than 50 pixels.

Indeed, as represented in FIG. 1A, the scan line A3 may cut a branch such as 5 whose general direction is parallel to this scan line. In this case, it is not sought to determine the width cut off by A3 on this branch 5, but scans will subsequently be performed in another direction, for example parallel to the line B1 which is perpendicular to A3, in order to determine the width of the section I5 which is actually of interest in the medical applications envisaged.

It should be underlined that in the analysis phase the assumption was made that the current pixel Pi was already at yo, both the center of the object to be determined and the center of the ideally placed top hat, from which it followed that the semi-width a(yo) which was found was also the sought-after semi-width of the object.

Now, it should be underlined that in the implementation of the method according to the invention, the determination of the position of the center yo of the object is precisely the object of the method, as is the determination of the semi-width a(yo).

This is why, in this first process, the method according to the invention will comprise several steps.

a) In a first step, the directions and the number of scan traces Δ are defined.

b) In a second step, the current pixel Pi is fixed at a position yi of the scan trace Δ, and in this position yi thus fixed, the criterion formed by equation 6), V(a), is examined and it is sought to determine the parameter a(yi) which maximizes the criterion V(a), that is to say which minimizes the function E of relation 3).

Choosing, for example, the semi-width "a" of the top hat to be at most 50 pixels, then 50 trials will be performed, the first with a=1 pixel, the second with a=2 pixels and so on to a=50 pixels. Generally, the semi-width is fixed as a ∈[al,am].

Thus, having chosen a specified interval, al to am, for example 1 to 50 pixels, for the semi-width "a", the value V(a) is computed as many times as values of "a" have been determined within the chosen interval [al,am]. Among all these values of V(a), a maximum, which is denoted V(yi) since it relates to the position yi of the current pixel at which the computations are made, is determined and retained. To this maximum V(yi) there corresponds a value which maximizes the function V(a) for fixed yi and constant Lt.

For this purpose, at this pixel Pi of which abscissa yi is thus fixed, the criterion formed by equation 6) is examined, in which:

$$S_1^a = S_1(yi+a) - S_1(yi-a-1) \qquad 5b')$$

$$S_1^b = S_1^{b1} + S_1^{b2} \qquad 5c')$$

$$S_1^{b1} = S_1(yi-a-1) - S_1(yi-a-b-1) \qquad 5d')$$

$$S_1^{b2} = S_1(yi+a+b) - S_1(yi+a) \qquad 5e')$$

as set out in the preceding exposition of the problem. In this criterion V in 6), the group $S_2^t$ is not to be computed. Hence, the computation is simple.

In the earlier exposition, it is recalled that these sums were defined as:

$$S1(yi+a) = \sum_{y=1}^{y=yi+a} g(y) \qquad 4a')$$

$$S1(yi-a-1) = \sum_{y=1}^{y=yi-a-1} g(y) \qquad 4b')$$

$$S1(yi+a+b) = \sum_{y=1}^{y=yi+a+b} g(y) \qquad 4c')$$

$$S1(yi-a-b-1) = \sum_{y=1}^{y=yi-a-b-1} g(y) \qquad 4d')$$

$$S2(yi+a+b) = \sum_{y=1}^{y=yi+a+b} g^2(y) \qquad 4e')$$

$$S2(yi-a-b-1) = \sum_{y=1}^{y=yi-a-b-1} g^2(y) \qquad 4f')$$

Figure 4A:
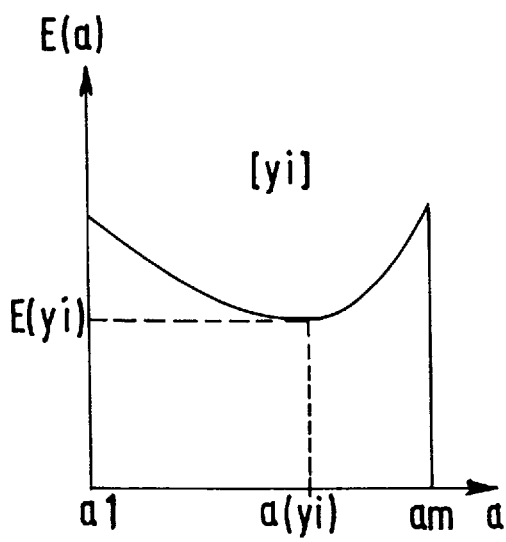
FIGS. 4A and 4B which illustrate the two successive minimizations to be applied to the error function E, in the case where one starts from the assumption that the semi-width "a" of the models varies within a given interval, and that the outer width "b" of the model is constant, the first for a given position of a current pixel as a function of this semi-width "a" varying in its interval; the second over the set of minimized values of E thus determined, and as a function of the corresponding positions of all the current pixels.

Represented in FIG. 4A is the function V(a) versus "a", the interval chosen for a ∈ [al,am], the maximum V(yi) and the semi-width a(yi) corresponding thereto, for Pi situated at yi.

c) In a third step, the computations of the preceding step are repeated for all the current pixels of the trace Δ having all the possible positions yi in a domain where yi ∈ [yl,yn].

For each different current pixel with position yi, this computation provides a new value V(yi) corresponding to this value yi and a new value a(yi), hence as many values V(yi), and values a(yi) as different positions yi on Δ.

So, having all these values V(yi) as a function of all the positions yi, that particular value of the yi for which the function V(yi) exhibits a maximum is determined next. This value is called yo. This maximum is then called V(yo). Hence, to this maximum V(yo) there moreover corresponds a value a(yo) of the parameter measuring the semi-width "a".

Figure 4B:
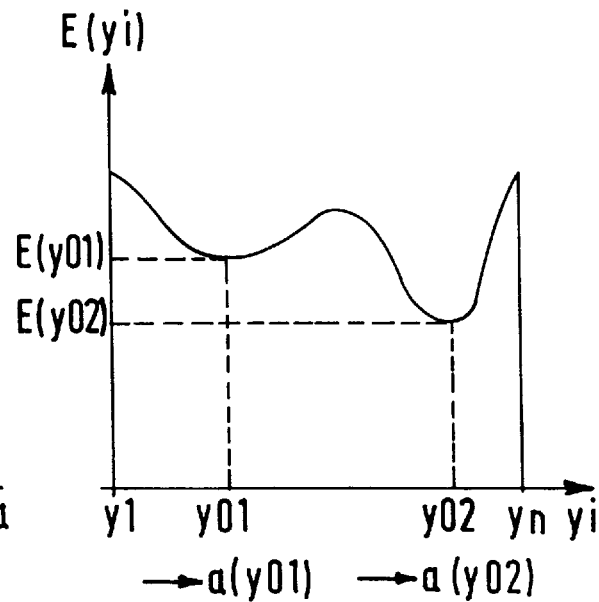

Represented in FIG. 4B is the set of values V(yi) determined in step c) by the process of step b), as a function of the position yi of the corresponding current pixels. This set of values V(yi) may exhibit one (or more) maximum (maxima), according as the scan trace Δ encounters one (or more) object(s) and hence determines one (or more) section(s) of objects along one (or more) segment(s) I.

If there is one object section I, FIG. 4B exhibits a maximum value V(yo) for a position yo which is therefore that of the center 0 of the segment.

With these values V(yo) and yo can be associated the value a(yo) which is retained as the semi-width of the segment I centered at yo.

d) In a next step, the values are retained of the position yo of the center 0 of the segment I determined by the trace Δ encountering the object in the image and that of the semi-width a(yo), and the operations are recommenced by scanning the image with other traces parallel to Δ and then optionally with traces parallel to other directions.

However, this first process has a flaw in the case in which the digital image to be processed contains branches or objects separated from one another by a small number of pixels, a few pixels. Indeed, it is apparent that, in this case, the error E is minimized when the top hat is positioned straddling the two peaks of the intensity profiles which result from this situation when scanning the image; this is the case of a scan represented particularly by the line A2 of FIG. 1A, the corresponding intensity profiles being represented in FIG. 2B.

Hence, in the situation of FIG. 2B, the error is minimized when the top hat flanks the two intensity peaks, whereas if the top hat is centered on one or other of the two peaks, the error is very large.

As a result, this first process described does not make it possible to distinguish between two vessels which are very close together. This is why a second process is proposed.

According to this second process, instead of fixing the total width Lt=La+Lb of the top hat, for computing the energy of the error, the dimension Lb of the edge of the top hat is fixed. Under these conditions, it will be possible to vary the width La of the central portion of the top hat and to deduce from this the total dimension Lt since the dimension of the edge Lb will not change.

This dimension Lb chosen for the edge, which may be a few pixels, will define the resolution of this second process, since it is this dimension which makes it possible to define the minimum distance which two branches of the tree-like structure can have between them in order to be distinguished from one another, or two objects of the digital image.

If a width Lb≅2 or 3 pixels has been chosen, it has thus been defined that branches 2 or 3 pixels apart will be distinguishable. In fact, the choice of Lb results from a compromise between resolution and robustness to noise. Thus, Lb=1 pixel would give the maximum resolution but lower robustness to noise.

Next, a model, or top hat, of variable central width La is chosen. However, to limit the amount of computations to be made, this second process enlists the idea expounded in the first process which consists in expressing the energy of the error E as a function of the cumulated sums of the intensities taken along the relevant scan line Δ.

According to the invention, it was seen that it suffices to compute these cumulated sums once and for all, along each of the chosen scan lines.

The set of computations relating to this second process is exactly the same as for the first process as far as the expression for the error in 3)

$$E(a,yi) = \left\{ S_2^t - \left[ \frac{(S_1^b)^2}{2b} + \frac{(S_1^a)^2}{2a+1} \right] \right\} / (2a+2b+1) \qquad 3)$$

In this second process:

Lb is fixed, that is to say b=constant in pixels, a varies, that is to say the semi-width a varies within an interval a∈[al,am]

Lt=2a+2b+1 varies.

As in the first process described earlier, it is sought to determine the position yo of the center of an object cut along a segment I by a scan trace Δ in the digital image, as well as the extremity points α, β of this segment, that is to say its semi-width a(yo).

This is why the method in this second process comprises the following steps:

a) In a first step scan traces Δ are defined, which possibly cut the objects of the image along segments I, and the actual intensity profile g(y) is determined along the line Δ.

b) In a second step, the current pixel Pi is fixed at a position yi on the scan trace Δ; for this purpose, at this pixel Pi whose abscissa yi is thus fixed, the criterion formed by equation 3) is examined, in which:

$$S_2^t = S_2(yi+a+b) - S_2(yi-a-b-1) \qquad 5a')$$

$$S_1^a = S_1(yi+a) - S_1(yi-a-1) \qquad 5b')$$

$$S_1^b = S_1^{b1} + S_1^{b2} \qquad c')$$

$$S_1^{b1} = S_1(yi-a-1) - S_1(yi-a-b-1) \qquad 5d')$$

$$S_1^{b2} = S_1(yi+a+b) - S_1(yi+a) \qquad 5e')$$

as was set out in the exposition of the first process. In this criterion E in 3), the group $S_2^t$ is not constant as was the case in the first process. Hence, this group $S_2^t$ is to be computed, since no simplification such as V for the first process can be found.

From the exposition of the first process, we still have:

$$S1(yi+a) = \sum_{y=1}^{y=yi+a} g(y) \qquad 4a')$$

$$S1(yi-a-1) = \sum_{y=1}^{y=yi-a-1} g(y) \qquad 4b')$$

$$S1(yi+a+b) = \sum_{y=1}^{y=yi+a+b} g(y) \qquad 4c')$$

$$S1(yi-a-b-1) = \sum_{y=1}^{y=yi-a-b-1} g(y) \qquad 4d')$$

$$S2(yi+a+b) = \sum_{y=1}^{y=yi+a+b} g^2(y) \qquad 4e')$$

$$S2(yi-a-b-1) = \sum_{y=1}^{y=yi-a-b-1} g^2(y) \qquad 4f')$$

Bearing in mind the criterion E in 3), it is sought to determine the parameter a(yi) which minimizes the criterion E(a) with $$Gb = \frac{S_1^b}{2b} \qquad 8a)$$

and $$Ga = \frac{S_1^a}{(2a+1)} \qquad 8b)$$

For this purpose, the semi-width "a" is chosen within the interval [al,am] chosen previously.

From all these values of E(a), the minimum is determined and retained, and is denoted E(yi) corresponding to a semi-width parameter denoted a(yi) ∈[al,am] since these minimum E(yi) and semi-width a(yi) values relate to the current pixel with position yi on the trace Δ.

Represented in FIG. 4A is the function V(a) versus "a", the interval chosen for a E [al,am], the maximum E(yi) and the semi-width a(yi) corresponding thereto, for Pi situated at yi.

c) In a third step, the computations of the preceding step are repeated for all the current pixels of the trace Δ having all the possible positions yi in a domain where yi ∈[yl,yn].

For each current pixel with position yi, this computation provides a value E(yi) corresponding to the value yi and a value a(yi), and hence as many values E(yi), and a(yi) as positions yi on Δ.

So, having all these values E(yi), as a function of all the positions yi, that value from the yi for which the function E(yi) exhibits a minimum is determined next. This value is called yo. This minimum is then called E(yo). Hence, to this minimum E(yo) there corresponds moreover a value a(yo) of the semi-width parameter "a".

Represented in FIG. 4B is the set of values E(yi) determined in the preceding step b) as a function of the position yi of the corresponding current pixels. This set of values E(yi) can exhibit one (or more) local minimum (local minima), according as the scan trace Δ encounters one (or more) object(s) and hence determines one (or more) section (s) I of objects.

If there is one object section I, FIG. 4B exhibits a minimum value E(yo) for a position yo which is therefore that of the center of the section I.

With these values E(yo) and yo can be associated the value a(yo) which is retained as the semi-width of the object centered at yo.

d) In a next step, the values are retained of the position yo of the center 0 of the segment I determined by the trace Δ encountering the object in the image and that of the semi-width a(yo), and the operation is recommenced by scanning the image with other traces parallel to Δ and then optionally with traces parallel to other directions.

With reference to FIG. 2C, it is shown that it is thus possible to detect the positions yo1 and yo2 of the centers 01 and 02 of the two objects giving the two peaks in the profile g(y). For this purpose, the distance 6 is chosen of the order of the value of the distance which separates the two objects. Two models or top hats M1 and M2 can thus be positioned suitably for the determination of the centers and semi-width of each of the objects.

Hence, finally, physically by means of each of the two processes according to the invention, the semi-width "a" of the central portion of the top hat which minimizes the error energy E of formula 3) has been sought.

For this purpose, the top hat has been moved along the scan trace Δ, positioning its center at the location of each current pixel; and for each position of the center of the top hat at a current pixel, the value has been sought of the semi-width "a" of the central portion of the top hat which minimized the error energy E.

Optionally, in the case of the first process in which it was possible to simplify the expression for the error energy E in order to use the formula V, and maxima of V were sought instead of minima of E directly.

A response, that is to say an error value and a semi-width value "a", were thus obtained for each pixel of the scan trace Δ. From these responses were then determined the local optimum or optima (that is to say minimum, minima, or maximum, maxima according as E or V respectively are processed), this providing the position yo of the central point(s) of the intensity profile(s) g(y) along the relevant scan trace Δ. The corresponding values of the semi-widths a(yo) were deduced from this.

Those skilled in the art might have imagined at the start that the computation of the function E such as defined in the formulation 1) was going to represent an enormous burden. Indeed, for each pixel of each trace, if formula 1) had been processed directly, it would have been necessary to position the top hat, define its width La, compute all the differences Gb−g(y) and Ga−g(y), as a function of a width La of the central portion, and square these differences; then redo the computation for another value of the width La etc.

However in fact, according to the invention, the data needed to compute the energy E of the sought-after error were determined simply by computing the sum function for the intensity profile along the scan line Δ and by storing it.

This amounts to saying that it suffices to take the sum along the direction of scan Δ of all the intensities relating to each pixel of this direction. This sum gives a value which expands on traveling along the line in the direction of scan, because an intensity level of positive value is assigned to each current pixel. If the intensity levels are graduated between 0 and 256 for example, and if the scan trace comprises 500 pixels, the sum to be computed will have a value of at most 500×256.

All the results are accumulated. Ramps result from this. Then differences are taken between the offset ramps, this providing the data needed to compute the energy E of the error (or else V).

Since the energy of the error E (or else V) is expressed as a function of cumulated sums of the profile just spoken of, it follows that this energy of the error is easily determinable once the intensity relating to each pixel of the scan trace Δ is known.

In the second process, it is necessary to compute not only the cumulated sums of the intensities of the pixels along each scan trace, but also the cumulated sums of the squared intensities.

Next, by differencing the cumulated sums, at each point, the optimal value for the semi-width of the central portion of the hat is deduced from this. The parameter "a" is chosen as the value which optimizes either the expression 3) for the error E, or the expression V in 6), which expressions depend only on the parameter a. Following which, by expressing the local maxima along the scan trace, the center of the branch or object cut by the scan trace is deduced, followed by the actual semi-width of the segment I delimited by the scan trace cutting this branch or object.

It should be noted that, to begin with, the first process, in which the parameter Lt is fixed and in which it suffices to process the simplified expression V, is simpler and faster to implement than the second process. However it is only valid when the digital image contains objects which are not very close together.

Next the second process, in which the parameter b is fixed and in which the expression E which includes computation of intensity squares must be processed, is a little lengthier to implement than the first process. However, on the other hand, it makes it possible to determine the centered elements and semi-widths of objects having any positions, even very close together.

Finally, in both of the two processes described, it is possible to implement a further step:

e) In this step, a validation test can be applied by virtue of the parameters Ga and Gb relating to the top hat which are expressed either by relations 7a, 7b, or by relations 8a, 8b depending on the process chosen and by virtue of the error functions E(yo) or V(yo). This test makes it possible to avoid:

the detection of objects without contrast against the background, hence likely forming part of the background and for which Ga is roughly equal to Gb;

the detection of an object which does not correspond at all to the model chosen, and for which the functions E(yo) or V(yo) portray an atypical value (error between model and signal too large).

This test consists in carrying out a step of computations in which are determined:

Ga(yo) and Gb(yo) 9) in accordance with relations 7a), 7b) or 8a), 8b).

The optimum computed according to the first or second process V(yo) or E(yo) is judged to be not significant of an object to be taken into account or to be retained,

- if $|Ga(yo) - Gb(yo)| <$ threshold $\Theta$

- if $E(yo) >$ threshold $\epsilon$ or if $V(yo) <$ threshold $\tau$ according to the process chosen.

The thresholds $\epsilon$, $\tau$ and $\ominus$ are chosen by those skilled in the art to allow the detection of objects having an intensity profile close to that of the rectangular model and having a significant luminance level contrasted against a sufficiently uniform background.

Other functions of the parameters Ga, Gb, E or V which are more complicated than simple thresholdings can also be implemented, as for example:

$V(yo) \times |Ga(yo) - Gb(yo)| < \text{threshold}$ to eliminate the non-significant objects, that is to say those which are poorly modeled or whose intensity is not sufficiently different from that of the background.

Figure 6A:
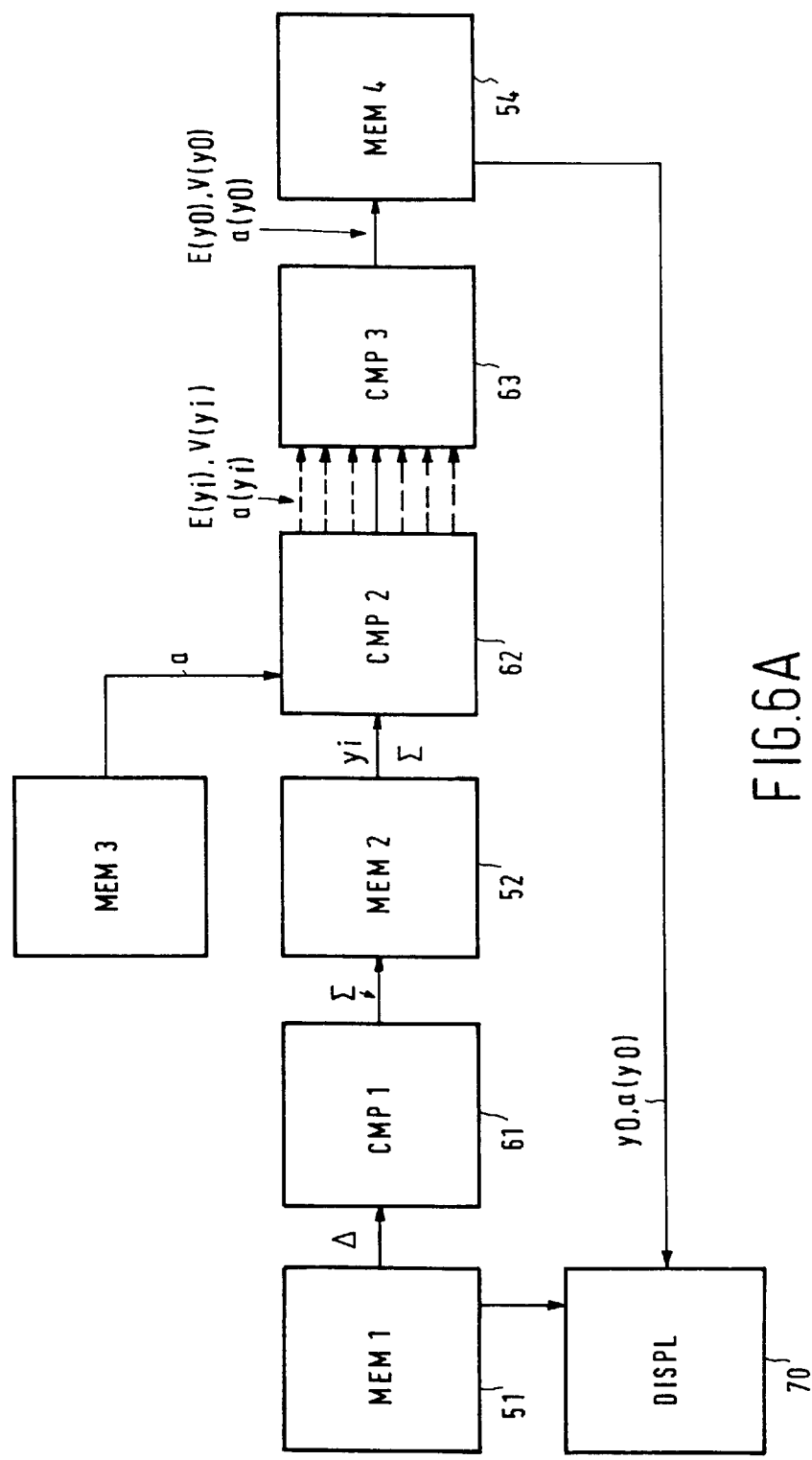
FIG. 6A illustrates a schematic block diagram for forming an arrangement suitable for implementing the method.

FIG. 6A shows a schematic block diagram representing means for implementing the method described above.

Figure 5A:
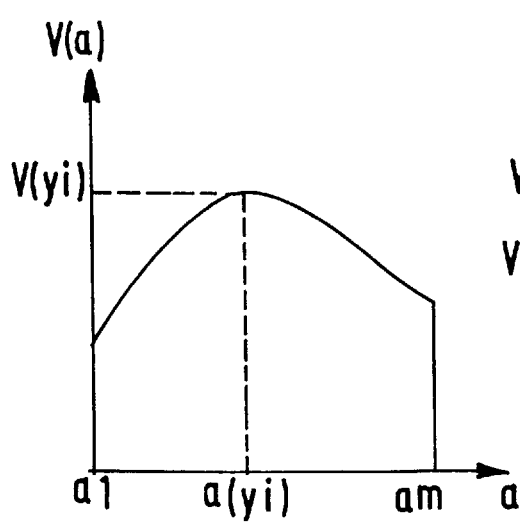
FIGS. 5A and 5B, illustrate the two successive maximizations to be applied to the simplified error function V, in the case where one starts from the assumption that the total width Lt of the model M(y) is fixed, the first for a given position of a current pixel, as a function of the semi-width "a" of the model varying in a given interval; the second over the set of maximized values of E thus determined, and as a function of the corresponding positions of all the current pixels.
Figure 5B:
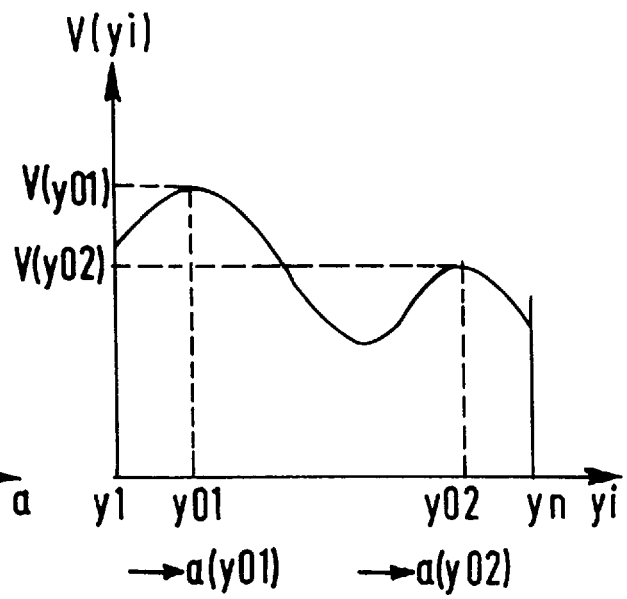
Figure 6B:
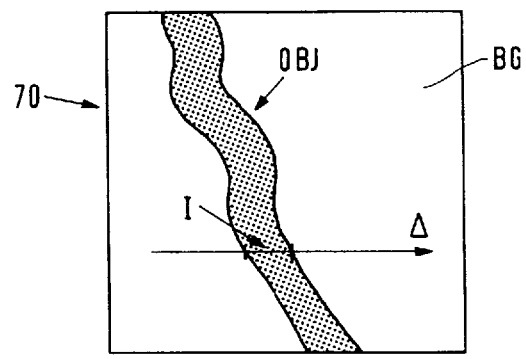
FIG. 6B represents schematically an image to be processed.

With reference to FIG. 6A, an arrangement is represented which allows the processing of an image including the representation of at least one object OBJ consisting of pixels of substantially uniform intensity contrasted against a background BG consisting of pixels of substantially uniform intensity as shown in FIG. 6B. This arrangement comprises:

storage means 51 labeled first storage means MEM1 for storing image data of the image and for providing a trace Δ scanning said image, said scan trace being formed by a set of adjacent pixels and cutting said object OBJ of the image in a segment I;

computing means 61 labeled first computing means CMP1 for computing cumulated sums Σ of intensities, and squared intensities of adjacent pixels in all intervals of this scan trace Δ, these intervals being delimited by a first pixel labeled origin pixel yl on one side, and by respectively each one of the pixels of said set of pixels, labeled end pixels on the other side as shown in FIG. 3;

storage means 52 labeled second storage means MEM2 for storing the output data of the first computing means 61;

computing means 63 labeled third computing means CMP3 for constructing, on the said set of pixels of the scan trace Δ, a function of said cumulated sums labeled second function E(yi), V(yi) and for estimating an optimal value E(yo), V(yo) of this second function as shown in FIGS. 4B and FIG. 5B;

storage means 54 labeled fourth storage means MEM4 for storing a value of the abscissa yo of a pixel of the scan trace Δ, and a value a(yo) of a parameter "a" labeled semi-width parameter, to constitute the abscissa of the center yo, and the semi-width a(yo) of said segment I determined by the trace Δ cutting the object OBJ. These values yo and a(yo) are, respectively, the values which yield said optimal value E(yo), V(yo) of the second function of the cumulated sums, constructed by the third computing means;

display means DISPL for displaying image, these means having a two-dimensional matrix of pixels.

With reference to FIG. 6A, this arrangement further comprises:

storage means 53 labeled third memory means MEM3 for storing a parameter "a" labeled semi-width parameter, this parameter being evaluated as a number of pixels variable between two limits (al, am);

computing means 62, labeled second computing means CMP2, for processing each pixel, labeled current pixel Pi defined by its abscissa yi on the scan trace Δ. These said second computing means (62) include:

means for determining a function E(a,yi), V(a,yi) labeled first function of said stored cumulated sums Σ, relative to the intervals on the scan trace Δ, of which the end pixels have an abscissa defined by the abscissa yi of the current pixel and by the semi-width parameter a, means for estimating a particular optimal value E(yi), V(yi) of said first function related to the current pixel Pi, in the limits (al, am) of said semi-width parameter as shown in FIG. 4A and FIG. 5A. The second function of the cumulated sums then being constructed by using these particular optimal values E(yi), V(yi) issued of said second computing means 62, and related to all pixels of the set of pixels of the scan trace Δ.

Figure 6C:
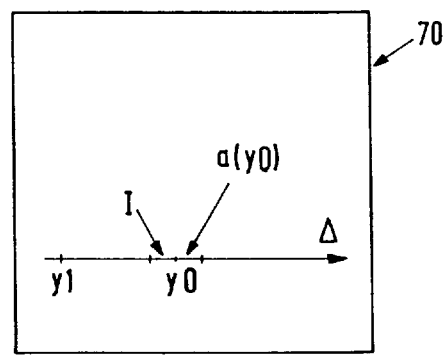
FIG. 6C represents schematically an image processed along a scan trace.

FIG. 6C represents schematically the result obtained as output from the fourth storage means MEM4, that is to say the abscissa on the trace Δ, in the image, of the center of the object, and the two semi-widths a(yo) either side of the center, enabling the segment I to be ascertained.

The arrangement of FIG. 6A makes it possible to process all the scan traces required to delimit the centers and edges of an object OBJ accurately.

I claim:

1. An arrangement for processing an image including the representation of at least one object (OBJ) consisting of pixels of substantially uniform intensity contrasted against a background (BG) consisting of pixels of substantially uniform intensity, this arrangement comprising:

storage means (51) labeled first storage means (MEM1) for storing image data of said image and for providing a trace (Δ) scanning said image, said scan trace being formed by a set of adjacent pixels and cutting said object (OBJ) represented in the image in a segment (I);

computing means (61) labeled first computing means (CMP1) for computing cumulated sums (Σ) of intensities, and squared intensities of adjacent pixels in all intervals of said scan trace (Δ), these intervals being delimited by a first pixel labeled origin pixel (yl) on one side, and by respectively each one of the pixels of said set of pixels, labeled the end pixels on the other side;

storage means (52) labeled second storage means (MEM2) for storing the output data of said first computing means (61);

computing means (63) labeled third computing means (CMP3) for constructing, on said pixels of the scan trace (Δ), a function of said cumulated sums labeled second function [E(yi), V(yi)] and for further estimating an optimal value [E(yo), V(yo)] of said second function constructed relative to said set of pixels of the trace;

storage means (54) labeled fourth storage means (MEM4) for storing a value of the abscissa (yo) of a pixel of the scan trace (Δ), and a value [a(yo)] of a parameter (a) labeled semi-width parameter, to constitute the abscissa of the center (yo), and the semi-width [a(yo)] of said segment (I) determined by said trace (Δ) cutting said object (OBJ) of the image, as, respectively, its values which yield said optimal value [E(yo), V(yo)] of the said second function of the cumulated sums, constructed by said third computing means; and display means for displaying said image, having a two-dimensional matrix of pixels.

2. An arrangement as claimed in claim 1, further comprising:

storage means (53) labeled third memory means (MEM3) for storing a parameter (a) labeled semi-width parameter, said parameter being evaluated as a number of pixels variable between two limits (al, am);

computing means (62), labeled second computing means (CMP2), for processing each pixel, labeled current pixel (Pi) defined by its abscissa (yi) on the scan trace (Δ), said second computing means (62) including:

means for determining a function [E(a,yi), V(a,yi)] labeled first function of said stored cumulated sums (Σ), relative to said intervals on the scan trace (Δ), of which the end pixels have an abscissa defined by the abscissa (yi) of the current pixel and by the semi-width parameter (a), means for computing a particular optimal value [E(yi), V(yi)] of the said first function related to said current pixel (Pi), in the limits (al, am) of said semi-width parameter, said second function of the cumulated sums then being constructed by using said particular optimal values [E(yi), V(yi)] issued of said second computing means (62), and related to all pixels of the set of pixels of the scan trace (Δ).

* * * * *